Dec. 6, 1938.   W. T. COOKE   2,139,490
REMOTE CONTROL SYSTEM
Filed Oct. 31, 1935
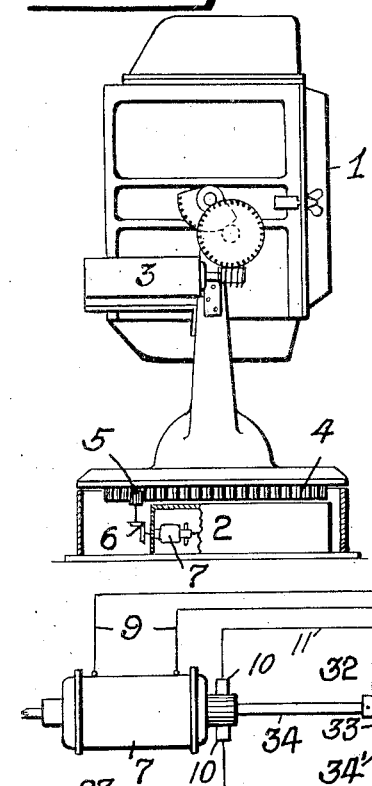
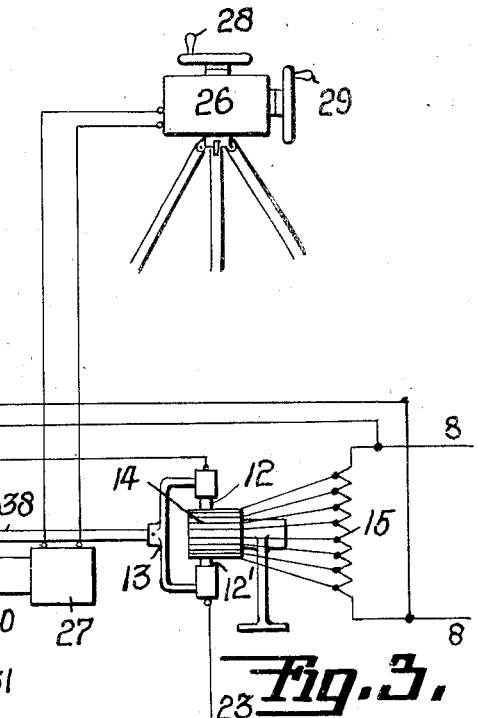
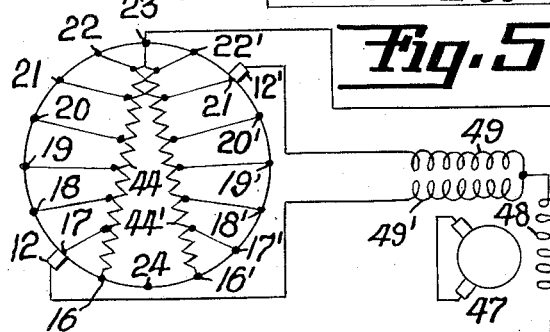
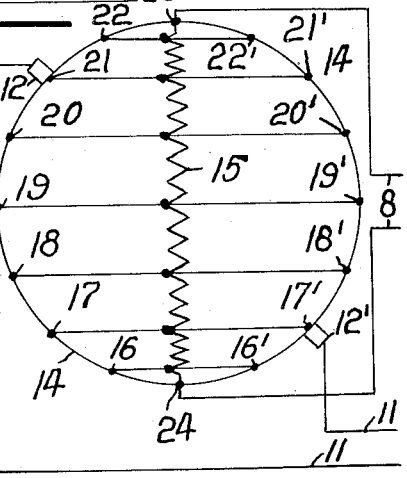
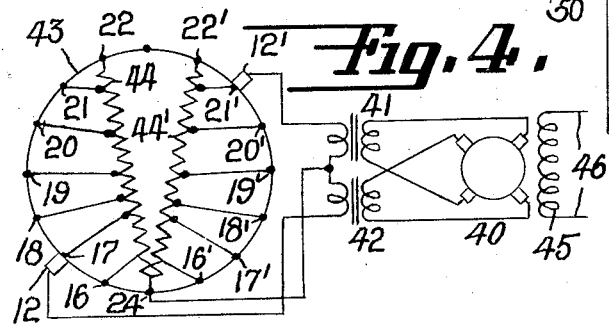
INVENTOR
William T. Cooke
BY
Herbert H. Thompson
HIS ATTORNEY.

Patented Dec. 6, 1938

2,139,490

UNITED STATES PATENT OFFICE 2,139,490

REMOTE CONTROL SYSTEM

William T. Cooke, Pelham Manor, N. Y., assignor to Sperry Gyroscope Company, Inc., Brooklyn, N. Y., a corporation of New York Application October 31, 1935, Serial No. 47,725

3 Claims. (Cl. 172—239)

This invention relates, generally, to remote control systems and the invention has reference, more particularly, to a novel remote control system especially adapted for controlling the position of objects, including heavy objects, such as searchlights, guns and other apparatus, from a distance.

Remote control systems adapted for the positional control of objects from a distance are generally quite complicated in nature and involve the use of more or less delicate apparatus such as thermionic valves and amplifiers, and hence are apt to get out of order, thereby requiring considerable attention in use.

The principal object of the present invention is to provide a novel remote control system especially adapted for the positional control from a distance of searchlights, guns and other objects, which system is of simple, rugged construction and accurate and dependable in use, the said system requiring but little attention and necessitating but infrequent repairs.

Another object of the present invention lies in the provision of a novel remote control system of the above character wherein a repeater motor, operated in response to movements of a controlling object, is so connected through differential gearing to a servo or power motor driving the controlled object, that any change in the relative positions of the repeater and servo motors corresponding to a departure of the controlling and controlled objects from synchronism, causes the differential gearing to shift a brush holding ring over a commutated resistor connected in the power supply to the servo motor, thereby operating the servo motor to restore synchronism between the objects.

A third object of the present invention is to provide a novel remote control system of the above character wherein the torque applied by the servo motor for driving the controlled object is automatically varied in accordance with the demands of the system, whereby the controlling and controlled objects are retained in substantial synchronism at all times regardless of the speed of movement of the controlling object or of the mass of the controlled object, the ratio of servo motor torque to the relative displacement of the objects being determined by the positions of the taps on the commutated resistor and hence adjustable in accordance with requirements.

Still another object of the present invention lies in the provision of a novel remote control system of the above character that is so constructed and arranged as to provide for dynamic braking of the servo or power motor as the objects come into positional agreement, the motor remaining cool when at standstill owing to the absence of current flow in its armature at such time.

Other objects and advantages will become apparent from the specification, taken in connection with the accompanying drawing wherein the invention is embodied in concrete form.

In the drawing,

Fig. 1 is a view in side elevation of a typical controlled object, with a part thereof sectioned to show the driving mechanism embodying the present invention.

Fig. 2 is a diagrammatic assembly view illustrating the principle of operation of the invention and shows the use of a direct current servo motor.

Fig. 3 is a schematic wiring diagram of the commutated resistor.

Fig. 4 is a wiring diagram illustrating the use of an A. C. motor of the repulsion type as the servo motor, and Fig. 5 is a wiring diagram illustrating the use of a compensated repulsion motor as the servo motor.

Similar characters of reference are employed in the above views to indicate corresponding parts.

Referring now to Figs. 1 to 3 of the drawing, the invention is shown as applied to moving a searchlight 1 in both azimuth and in elevation, the azimuth control device being shown at 2 and the elevation control device at 3, said devices being substantially duplicates. It will be understood, however, that a searchlight is shown only for purposes of illustration and that this invention is equally applicable to the remote control of other objects such as guns, for example. The controlled object 1 to be moved is illustrated as provided with an annular rack 4 which meshes with a pinion 5 forming one end of reduction gearing 6 driven from the servo or power motor 7 illustrated as a shunt type direct current motor. Reduction gearing 6 provides for the running of motor 7 at a much higher speed than that of the controlled object, whereby a large torque may be exerted upon the controlled object while at the same time enabling the latter to be moved through very small angular distances, thereby providing a very fine control of the movement of such object.

The field winding of motor 7 is illustrated as supplied from a D. C. source 8 through leads 9. The rotor commutator brushes 10 of motor 7 are shown connected by leads 11 to brushes 12 and 12' carried by a turnable brush ring 13. Brushes 12 and 12' engage diametrically opposite points of a commutated resistor comprising a commutator 14 having consecutive segments in each half thereof connected respectively to successive sections of a resistor 15 that is connected across the source 8. Thus, as shown in Fig. 3, commutator segments 16, 16' on opposite halves of the commutator 14 are connected to a common point of resistor 15. The same is true of commutator segments 17, 17'; 18, 18', etc. Hence, it will be apparent that when the brush ring 13 is so positioned that brushes 12 and 12' engage segments 23 and 24 connected to the ends of resistor 15, full line voltage is supplied through leads 11 to the armature of motor 7, causing this motor to exert its maximum torque. On the other hand, when the brush ring 13 is so positioned that brushes 12 and 12' engage segments 19, 19' connected to a common point of resistor 15, then no voltage is supplied across the brushes of motor 7 so that its armature receives no current from the source 8 and hence this motor 7 is at standstill.

As brushes 12 and 12' are moved either clockwise or counter-clockwise from assumed positions on segments 23 and 24, the voltage supplied to the armature of motor 7 decreases until it becomes zero with these brushes on segments 19 and 19'. Further turning of these brushes causes the voltage across the armature of motor 7 to reverse, thereby driving this motor in the reverse direction. Assuming that brushes 12 and 12' are initially on segments 19 and 19' with the motor 7 at standstill, then the direction of turning of brush ring 13 will determine the direction in which motor 7 will operate. Hence, it is apparent that to control the operation of the controlled object 1 from a distance it is merely necessary to control the turning or rotation of brush ring 13 with respect to commutator 14.

To accomplish the rotation of brush ring 13, there is provided any suitable form of distant controlling object or transmitter 26 which may be of the form disclosed in Patent No. 1,850,598 of Chester B. Mills and Preston R. Bassett, wherein the casing of transmitter 26 may be rotated bodily about a vertical axis, whereby transmitters are operated leading to the receiving synchronous motor 27, which may be of any suitable type, either A. C. or D. C. In addition to rotating the casing of transmitter 26, handles 28 and 29 may be provided for operating fine transmitters to control the synchronous motor 27 and the corresponding motor of the elevation control device 3. It will be understood, however, that any type of controller or transmitter may be substituted for transmitter 26, including the self-synchronous or selsyn type or the type wherein a handle is operated over a potentiometer to impress a certain voltage upon a continuously running motor, and that two such controllers and two such motors may be employed for controlling the movements of brushes 12.

The rotor of receiver 27 is connected through gearing 30 to one bevel gear 31 of differential gearing 32 having its other bevel gear 33 fixed on the armature shaft 34 of power motor 7. The arm 34' of differential gearing 32 carries bevel idlers 35 meshing with gears 31 and 33, and also has fixed thereon a gear 36 that meshes with a gear 37 fixed on brush ring drive shaft 38.

In operation, as long as the transmitter device or controlling object 26 is in positional synchronism with the controlled object or searchlight 1, the differential gearing 32 will serve to position brushes 12 and 12' on commutator segments 19 and 19', in which position no current is supplied to the armature of power motor 7 and consequently this motor is stationary. As soon, however, as the controlling object 26 is turned with respect to the controlled object 1, the receiving motor 27 is operated to drive bevel gear 31, and since bevel gear 33 is stationary, the arm 34' is turned to effect the turning of brush ring 13, whereby brushes 12 and 12' move off segments 19 and 19', causing a potential to be applied across motor brushes 10, 10 and effecting the starting of motor 7 in the proper direction to again bring the controlled object 1 into synchronism with the controlling object 26.

Inasmuch as the potential between brushes 12 and 12' increases with increase in the relative displacement of objects 1 and 26, the torque exerted by motor 7 will also increase, thereby effecting a rapid return of the objects to synchronism. As the objects move toward synchronism due to the rotation of power or servo motor 7, the shaft 34 of this motor operates through differential gearing 32 to cause brush ring 13 to move brushes 12 and 12' toward commutator segments 19 and 19'. As the objects reach synchronism, brushes 12 and 12' engage segments 19 and 19', thereby shorting commutator brushes 10, 10 and hence the armature of motor 7 to effect an immediate stoppage of motor 7 through dynamic braking, whereby the objects are brought into synchronism in a dead beat manner without hunting. It will be apparent that the ratio of the torque exerted by motor 7 to the relative displacement of the objects may be varied to suit the requirements of any particular installation by merely varying the positions of the commutator taps on resistor 15.

Thus, it will be apparent that the novel position control system of this invention, while of extremely simple construction, nevertheless provides, owing to the complete control of the relation of power motor torque with respect to the relative displacement of the objects, and to the dynamic braking of this motor, for the substantial maintenance of the objects in synchronism at all times and without surging or hunting.

It is to be understood that the system of the present invention may be used for controlling A. C. power or servo motors as well as D. C. motors such as motor 7. Thus, in Fig. 4 there is illustrated an A. C. repulsion motor 40 for use in lieu of power motor 7. One pair of brushes of repulsion motor 40 is connected across the primary winding of a transformer 41, whereas the other pair of brushes of this motor is connected across the primary winding of a transformer 42. The secondary windings of transformers 41 and 42 are connected to a commutated resistor comprising a commutator 43 similar to commutator 14 previously described, and having its segments similarly numbered. A resistor consisting of equal resistance elements 44 and 44' is so connected to commutator 14 that similar points of resistance elements 44 and 44' are connected to corresponding commutator segments on opposite sides of the commutator 14. Corresponding ends of resistance elements 44 and 44' are connected together and to the segment 24, whereas the other ends of these resistance elements 44 and 44' are connected respectively to segments 22 and 22'.

Corresponding terminals of the secondary windings of transformers 41 and 42 are connected to brushes 12 and 12', whereas the remaining terminals of the secondary windings of these transformers are connected together and to segment 24. Thus, it will be noted that with brushes 12 and 12' on segments 19 and 19', equal resistances are included in the secondary circuits of transformers 41 and 42, whereas when these brushes are shifted off segments 19 and 19' by movement of brush ring 13, the resistance in one of the secondary circuits will decrease while that in the other will increase.

The field winding 45 of motor 40 is supplied with A. C. by leads 46, so that an alternating potential is induced in the rotor of this motor, and therefore potentials appear across the brushes of this motor, which are applied to the primary windings of transformers 41 and 42. Hence, when brushes 12 and 12' are moved off segments 19 and 19' due to a departure of the objects 1 and 26 from synchronism, the primary current of one of the transformers 41 or 42 will exceed that of the other, thereby causing motor 40 to rotate in the proper direction to bring the objects into synchronism. This will be apparent when it is noted that by decreasing the resistance in the secondary circuit of a transformer, the primary current increases. It will be apparent that the ratio of the torque exerted by motor 40 to the relative displacement of the objects may be varied to suit the requirements of any particular installation by varying the position of the commutator taps on resistance elements 44 and 44'.

In Fig. 5 an A. C. compensated repulsion motor is illustrated as employed as the servo or power motor in the system of this invention. In this figure, parts which are similar to those in the preceding figures are similarly numbered. The compensated repulsion motor 47 is shown as having a main field winding 48 and compensating windings 49 and 49' supplied with A. C. from source 50. The compensating windings 49 and 49' have corresponding ends connected together and to the main winding 48, whereas the other ends of these compensating windings are connected respectively to brushes 12 and 12'. Thus, when these brushes are on segments 19 and 19', equal resistances are included in the circuits of windings 49 and 49' and motor 47 is stationary, whereas upon the shifting of brushes 12 and 12' due to lack of synchronism of the objects, one of the windings 49 or 49' carries the larger current, thereby causing motor 47 to operate in the proper direction to again synchronize the objects.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a remote positional control system for moving objects in synchronism, a controlled object, a controlling object, an A. C. motor having reversing windings for driving said controlled object, and control means for said motor comprising a commutator, a resistor having complementary resistor elements connected together at one end and having corresponding points thereof connected to corresponding points on opposite sides of said commutator, shiftable brushes engaging said commutator and electrically connected respectively to said reversing windings, the shifting of said brushes over said commutator determining the magnitude and direction of the torque produced by said motor, and differential means operated from said controlling and controlled objects for shifting said brushes over said commutator.

2. In a remote positional control system for moving objects in synchronism, a controlling object, a controlled object, an A. C. motor having reversing windings for driving said controlled object, an A. C. supply having one side thereof connected to said reversing windings, a commutator, a resistor having similar resistance elements connected together and to the other side of said supply, said resistor elements having corresponding points thereof connected to correspinding points on opposite sides of said commutator, shiftable brushes engaging said commutator and electrically connected respectively to said reversing windings, the shifting of said brushes over said commutator determining the magnitude and direction of the torque produced by said motor, and differential means operated from said controlling and controlled objects for shifting said brushes over said commutator.

3. In a remote positional control system for moving objects in synchronism, a controlling object, a controlled object, an A. C. motor having reversing windings for driving said controlled object, secondary windings inductively associated with said reversing windings and connected together at one of their ends, a commutator, a resistor having similar resistance elements connected together and to the connected ends of said secondary windings, said resistor elements having corresponding points thereof connected to corresponding points on opposite sides of said commutator, shiftable brushes engaging said commutator and connected respectively to the remaining ends of said secondary windings, the shifting of said brushes over said commutator determining the magnitude and direction of the torque produced by said motor, and differential means operated from said controlling and controlled objects for shifting said brushes over said commutator.

WILLIAM T. COOKE.